United States Patent
Stadler et al.

(10) Patent No.: US 6,813,652 B2
(45) Date of Patent: Nov. 2, 2004

(54) REDUCED-OVERHEAD DMA

(75) Inventors: Mark Stadler, Mountain View, CA (US); Asgeir Thor Eiriksson, Sunnyvale, CA (US); Kianoosh Naghshineh, Palo Alto, CA (US)

(73) Assignee: Chelsio Communications, Inc., Sunnyvale, CA (US)

(*) Notice: Subject to any disclaimer, the term of this patent is extended or adjusted under 35 U.S.C. 154(b) by 0 days.

(21) Appl. No.: 10/474,499
(22) PCT Filed: Apr. 11, 2002
(86) PCT No.: PCT/US02/11582
§ 371 (c)(1), (2), (4) Date: Apr. 19, 2004
(87) PCT Pub. No.: WO02/084498
PCT Pub. Date: Oct. 24, 2002

(65) Prior Publication Data
US 2004/0172490 A1 Sep. 2, 2004

Related U.S. Application Data
(60) Provisional application No. 60/283,284, filed on Apr. 11, 2001.

(51) Int. Cl.[7] .............................................. G06F 13/00
(52) U.S. Cl. .............................. 710/22; 710/29; 710/33; 710/52; 710/308; 709/212
(58) Field of Search ........................... 710/23–35, 52–57, 710/308–310; 709/212–213

(56) References Cited

U.S. PATENT DOCUMENTS

| 4,733,396 | A | | 3/1988 | Baldwin et al. ............ 714/764 |
|---|---|---|---|---|
| 5,561,821 | A | | 10/1996 | Gephardt et al. ............. 710/28 |
| 5,696,989 | A | | 12/1997 | Miura et al. ................... 710/24 |
| 5,828,856 | A | | 10/1998 | Bowes et al. ................ 710/308 |
| 5,835,788 | A | * | 11/1998 | Blumer et al. ................ 710/23 |
| 5,905,912 | A | | 5/1999 | Story et al. ................... 710/27 |
| 5,928,339 | A | * | 7/1999 | Nishikawa .................... 710/26 |
| 6,081,851 | A | | 6/2000 | Futral et al. .................. 710/23 |
| 6,115,776 | A | * | 9/2000 | Reid et al. .................. 710/260 |
| 6,185,634 | B1 | | 2/2001 | Wilcox .......................... 710/26 |
| 6,199,121 | B1 | * | 3/2001 | Olson et al. .................. 710/24 |
| 6,292,878 | B1 | | 9/2001 | Morioka et al. ............. 711/209 |

OTHER PUBLICATIONS

International Search Report mailed on Aug. 26, 2002, for PCT patent application No. PCT/US02/11582 filed on Apr. 11, 2002, four pages.

* cited by examiner

Primary Examiner—Christopher B. Shin
(74) Attorney, Agent, or Firm—Morrison & Foerster LLP

(57) ABSTRACT

A plurality of direct memory access data transfers are accomplished to transfer data from a host to an adaptor. For each transfer, an indication of locations of at least one group of storage locations associated with the host available to hold the data to be transferred to the host is provided from the host to the adaptor. An indication of the provided indication is maintained, for that transfer, by the host. Based on the indication of locations provided from the host to the adaptor, data is transferred to the at least one group of storage locations from the adaptor. An indication is provided from the adaptor to the host that the data transferring step has been completed with respect to the at least one group of storage locations. The host determines the locations corresponding to the at least one group of storage locations based on the indications maintained by the host and retrieving the data from the at least one group of storage locations based on the determination. A similar method is provided to transfer data from the adaptor to the host. Broadly speaking, the host and adaptor retain state information between DMA data transfers. As a result, absolute values of overhead items need not be transferred between the host CPU and the I/O device for each DMA data transfer, and the amount of overhead is reduced.

16 Claims, 2 Drawing Sheets

REDUCED-OVERHEAD DMA

TECHNICAL FIELD

The present patent application relates to controlling direct memory access (DMA) transfers between a host and an input/output (I/O) device. More particularly, the control is accomplished with reduced overhead.

BACKGROUND

Direct memory access (DMA) is typically used to transfer large amounts of data between a host central processing unit (CPU) and a DMA input/output (I/O) device. Briefly, the host CPU provides the DMA I/O device with information about where to place (for input) or from where to fetch (for output) data from host memory such that the I/O device independently from the data transfer operation. As a result of the I/O device independently performing the I/O operation, the host CPU is relieved of handling much of the processing associated with the I/O operation.

The information about where to place or from where to fetch, among other information describing and/or controlling the to-be-performed data transfer, is known as "overhead information," and the overhead information is typically transferred from the host CPU to the I/O device in association with the data transfer. For example, the volume of data to be transferred may be so large that it does not fit contiguously into the host memory. In this case, different regions of the host memory may be utilized and the locations of these different regions are conveyed to the I/O device in the transfer of overhead information from the host CPU.

A fundamental metric DMA performance metric is the ratio of the amount of overhead data transferred to the amount of actual data transferred. For example, it is believed that the 21143 PCI/CardBus 10/100 Ethernet LAN Controller, from Intel Corporation of Santa Clara, Calif., requires a transfer of between 32 and 64 bytes of overhead data per DMA transfer. Thus, if a DMA transfer is about 60 bytes, then this mounts to 50% efficiency (or perhaps more properly, inefficiency) in the data transfer.

SUMMARY

A plurality of direct memory access data transfers are accomplished to transfer data from a host to an adaptor. For each transfer, an indication of locations of at least one group of storage locations associated with the host available to hold the data to be transferred to the host is provided from the host to the adaptor. An indication of the provided indication is maintained, for that transfer, by the host. Based on the indication of locations provided from the host to the adaptor, data is transferred to the at least one group of storage locations from the adaptor. An indication is provided from the adaptor to the host that the data transferring step has been completed with respect to the at least one group of storage locations. The host determines the locations corresponding to the at least one group of storage locations based on the indications maintained by the host and retrieving the data from the at least one group of storage locations based on the determination.

A similar method is provided to transfer data from the adaptor to the host.

Broadly speaking, the host and adaptor retain state information between DMA data transfers. As a result, absolute values of overhead items need not be transferred between the host CPU and the I/O device for each DMA data transfer, and the amount of overhead is reduced.

DETAILED DESCRIPTION

Figure 1:
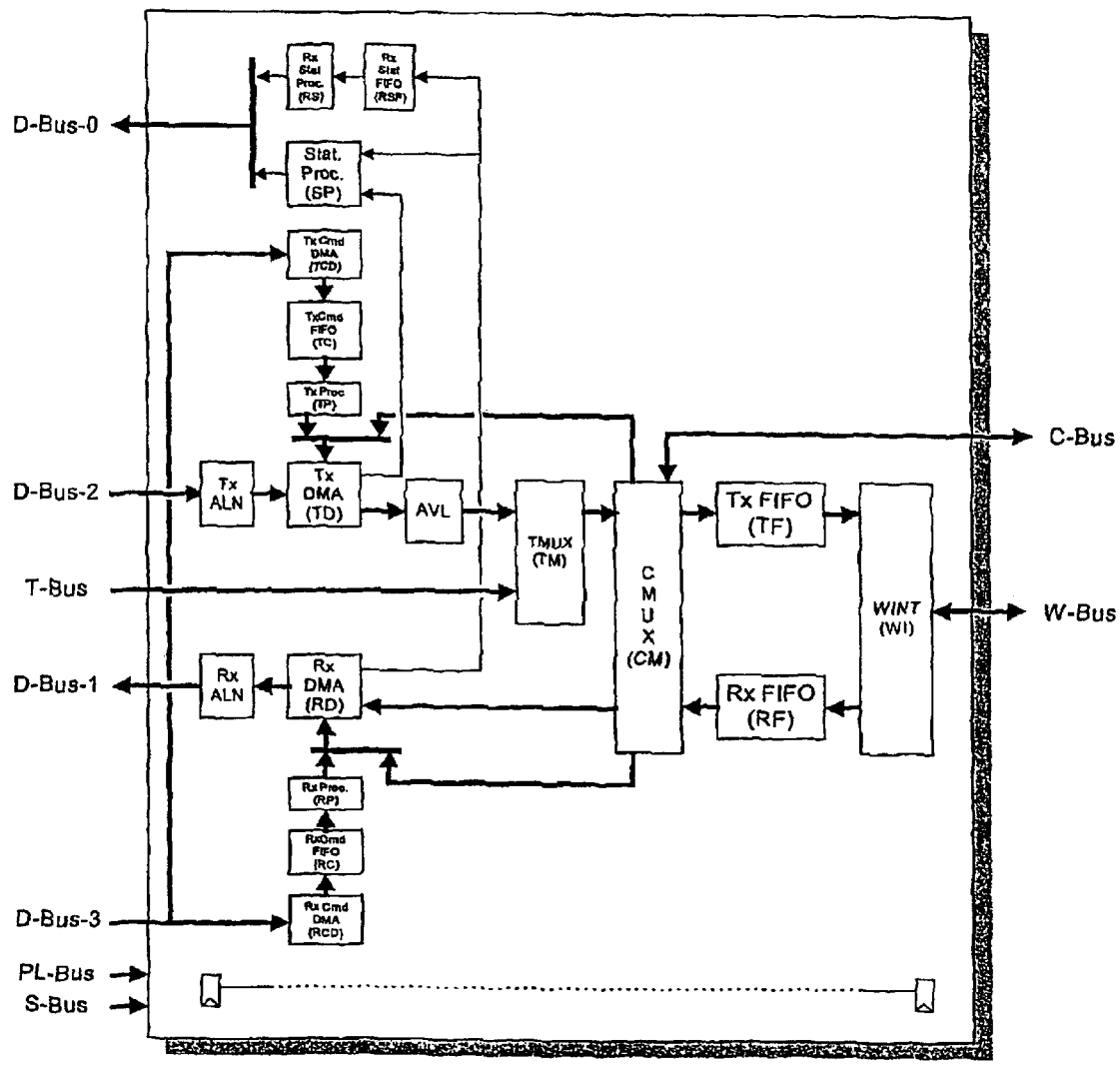
FIG. 1 illustrates an embodiment of a DMA I/O device in accordance with the invention.

FIG. 1 is a block diagram illustrating an embodiment of a DMA I/O device in accordance with an embodiment of the invention. The shaded registers indicate clocking points to assist the interfaces in being "well-behaved" for timing purposes. All receive and transmit references in this detailed description are with respect to the "clients" of the DMA device. For example, a typical "client" is an application executing by a host CPU. The In this description, each module is denoted by a two or three letter acronym that is used in naming the related file instantiations, signals, etc.

Before describing the operation of the modules, though, the bus data signals are described in the following table.

| | |
|---|---|
| PL-Bus: PCI Local Bus. | This is a simple generic, Programming Input Output (PIO), bus that is used to interface to DMA device's core logic. This bus allows access to local registers that are used to program the DMA device, by, e.g., a CPU or a PCI bus. In addition, due to its asynchronous nature, this bus shields the DMA device's core logic from the client's clock domain. |
| W-Bus: Wide Bus. | This bus is employed to transfer data and payload to/from the DMA device's clients. |
| T-Bus: Target Bus. | This bus is employed to transfer data to/from the PCI block when the DMA device is operating as a PCI target device. The PCI block in this case is the master of the operation relative to the DMA device. |
| C-Bus: CPU Bus. | This bus is employed to transfer data to or from any PCI locations directly as well as read and write the head of the Rx/Tx FIFO's. This bus provides a generic interface to a local CPU. |
| D-Bus: DMA Bus. | This bus is employed to communicate with the PCI core. This is the main mechanism to transfer data to/from the PCI core when the DMA device is the master of the operation. |
| S-Bus: Serial Bus. | This is a serial interface, which is used to load the "personality" of the DMA device, at boot time for example. The "personality" may include various reset values and other characteristics. |

The operation of each block of the FIG. 1 DMA device is now briefly summarized.

Receive Processor (RP). The RP module receives commands from the host and processes the commands to form a free list of addresses for use by the receive DMA (RD) engine.

Receive Command FIFO (RC). This block is a first-in, first-out (FIFO) buffer that holds the "well-formed" free list of addresses for use by the Receive DMA engine. There are two instances of the FIFO—RCH and RCL—one for each of high and low priority, respectively. The FIFO is 128 bytes deep, plus any necessary sidebands.

Receive DMA (RD). This module provides the "receive data" to the host addresses (lengths as specified by the RC block).

Transmit Command Processor (TP). This module interprets the commands from the host and forms commands for the Transmit DMA (TD) engine.

Transmit Command FIFO (TC). This FIFO contains the well-formed commands for the Transmit DMA operation There are two instances of the FIFO—TCH and TCL—one for each of high and low priority. This FIFO is 128 bytes deep, plus any necessary sidebands.

Transmit DMA (TD). This module provides the "transmit data" from the host addresses (lengths as specified by the TC block). This module also implements the Target Channel Interface (TI), that translates the Target Channel Interface protocol to FIFO write signals.

Target Bus Mux (TM). This module multiplexes the target channel onto the W-Bus and also generates the T-Bus protocol.

CPU Bus Mux (CM). This module multiplexes the C-Bus onto and from the W-Bus.

Transmit FIFO (TF). This is the "transmit elasticity° FIFO. It is preferably deep enough so as to sustain a long burst (e.g., 512 bytes deep plus sidebands).

Receive FIFO (RF). This is the "receive elasticity" . It is preferably deep enough so as to sustain a long burst (e.g., 512 bytes deep plus sidebands).

Wide Bus Interface (WI). The Wide Bus Interface module routes the W-Bus from the Transmit FIFO's, and to the Receive FIFO's.

Status Processor (SP). The Status Processor converts the status signals from the modules into messages to the host. The status signals consist of the value of several registers in the DMA I/O device, that indicate how far the device has progressed in writing to particular host FIFO-s, and how far the device has progressed in reading from particular host FIFO's. It also handles the host interrupt logic.

Rx Status Processor (RS). The Status Processor provides the Rx commands to the host, indicating where the RxDMA module wrote the data.

Rx Status FIFO (RSF). This module buffers per packet, and per page status messages from the RxDMA module.

Rx Command DMA (RCD). This module fetches receive free list commands from the host and handles the flow control.

Tx Command DAM (TCD). This module fetches transit commands from the host and handles the flow control.

Add VLAN (AVL). This module inserts per packet VLAN (Virtual Local Area Network) information into each packet as specified by the transit command stream. For example, in one embodiment, a two-byte VLAN packet is inserted between the 12th and 13th bytes of the packet.

Receive Aligner (Rx ALN). This module accepts an arbitrary byte address from RxDMA and the data left justified. The module transfers a 64-bit aligned address to the PCI along with the data starting at the correct byte lane and the byte-enables corrected.

Transmit Aligner (Tx ALN). This module accepts an arbitrary byte address from TxDMA and takes the data from the correct byte lanes and packs it left justified for use of the W-Bus.

Figure 2:
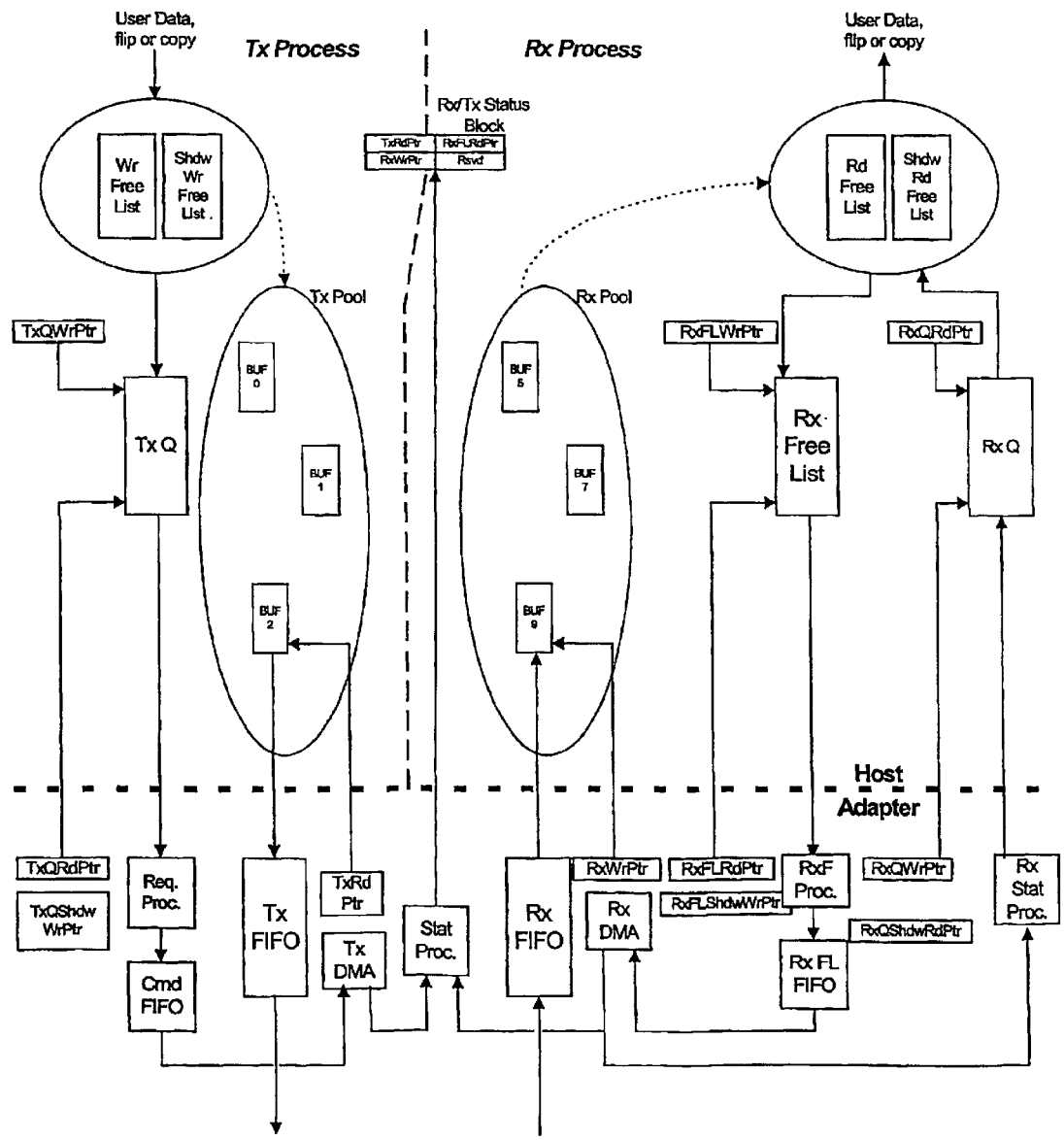
FIG. 2 illustrates an example operating scenario of the FIG. 1 DMA I/O device.

FIG. 2 illustrates an example of how the FIG. 1 embodiment operates. First the transmit operation in accordance with an embodiment is described. The transmit operation starts with the host CPU storing the user data to be transmitted in host memory transmit buffers BUF0, BUF1, BUF2, . . . BUFn of a pool of buffers, TxPool. The host memory transmit buffers are buffers of potentially arbitrary length, starting at potentially arbitrary addresses in a memory associated with the host. Information about the host memory transmit buffers in which the user data is held is stored in a software request queue of the host herein referred to as transmit queue (TxQ). The TxQWrPtr register provides information about the end of the TxQ. The host notifies the adaptor to update the value of the TxQShdwWrPtr register (e.g., by doing a single PIO write to the adaptor) to be the value of the TxQWrPtr register. The adaptor, upon detecting a difference between the value in the TxQRdPtr register (which indicates from where in the TxQ the adaptor last read host memory transmit buffer information) and the QShdwWrPtr value, receives a collection of the host memory buffer information from the TxQ by, for example, direct memory access. The TxQProc processor processes the host memory buffer information to generate TxCommands, and stores the TxCommands in the TxCmdFIFO—to control the Tx DMA. The adaptor fetches the data from the host memory transmit buffers (TxPool) into the TxFIFO according to the information in the Tx commands, appropriately modifying the TxRdPtr into the TxPool as the user data is fetched.

Once the data from a particular host memory buffer in TxPool is completely consumed (i.e., has been fetched), the host puts the memory locations of the consumed data on the WrFreeList. The host, which keeps a copy of all the addresses that were given to the adaptor, uses the provided TxRdPtr value to determine the addresses of locations in the TxPool that are free and places an indication of those locations on the WriteFreeList. The host periodically causes the TxQShdwWrPtr value in the adaptor to be updated from the TxQWrtPtr (which, for example, may ensure that the adaptor never runs out of commands).

The adaptor from time to time refills the TxCmdFIFO from the host TxQ. The command queue refill may be periodic, with the period being programmable in the adaptor in units of bytes of data transferred. The refill may also occur immediately if TxCmdFIFO is empty when the ShadowWritePointer value is caused to be written.

Now the receive operation is described. The receive operation is similar in many respects to the transmit operation. The host reserves host memory receive buffers in RxPool for to-be received data and places pointers to the reserved buffers on a software free list RxFreeList. The free list pointers are provided to the adaptor device in a fashion similar to that by which transmit commands are provided to the adaptor device in the transmit operation. The RxFLWrtPtr in the host and the RxFLRdPtr and RxFLShdwWrtPtr in the adaptor point to the RxFreeList. The host conveys the existence of receive free list information to the adapter by updating the RxFLShdwWrtPtr.

RxFIFO holds the data to be received into the host from the adaptor. As the data arrives into the buffers in RxPool from the RxFIFO, the adaptor sends status information about the buffers to the host via the RxQ queue maintained by the host. The adaptor controls the RxQWrtPtr and the RxQShdwWrtPtr. For example, the RxStatProc of the adaptor causes commands to be stored to the RxQ indicating the packet boundaries and lengths. It is noted that there is no need to provide the actual addresses of buffers in RxPool. That is, the adaptor only has to indicate when it is switching buffers because the host maintains the RxFreeList which is a queue of all the free list elements issued to the adaptor. As the receive status commands in RxQ are parsed by the host, the processes the RxFreeList tp deter,ome the corresponding address in the RxPool. After the host retrieves the received data from a particular host memory receive buffer, the host puts that host memory receive buffer back onto the RdFreeList.

In one example, the refill of RxQ is governed by the depth of RxQ and the amount of information data in RxQ. In one example, when RxQ drops below 32 bytes and a refill period timer has elapsed, then a DMA fetch is made to transfer status signals from the RxStatProc to RxQ.

In some examples, the adaptor maintains two priority queues each for the Tx and Rx directions. This results in duplicate sets of registers, queues, and other resources in the adaptor.

Deadlock issues (or, more properly, the lack thereof) are now discussed. In some examples, all Rx and Tx resources are mutually exclusive. As such, no hardware deadlock conditions exists. In addition, all the reply paths from the adaptor to the host have the highest priority and cannot be blocked Further, there are duplicate sets of registers and other resources in the adaptor for each priority queue.

With respect to interrupt handling, in some examples, the only normal mode interrupt occurs when the RxDMA process transitions from no packet transfer to the first packet transfer. In addition, the adaptor generates interrupts for error cases, as flagged by the PCI interface.

Flow control in a "Switch Mode" is now discussed. In the transmit direction, if the outbound traffic is paused (e.g., by a media access controller—or MAC); the TxFIFO may eventually become full and signal the full condition via a pin to the adaptor. At that time, the TxDMA ceases operation once it has finished its current DMA cycle. In the receive direction, if the host cannot keep up with the data traffic (i.e., retrieve the data rom the RxPool), the adaptor may eventually run out of free list elements (i.e., buffer into which it can store data) and ceases operation, which in turn results in the RxFIFO becoming full and a flow control signal being issued to the MAC. This signal will result in a PAUSE frame to be issued by the MAC with a predetermined time value. If the traffic does not cease, the MAC will eventually drop packets.

For broadcast and multicast, in the adapter mode and in the absence of a Forwarding Engine, the MAC's address match logic is used for multicast and broadcast handling.

Bundling is handled entirely in software. The software sections off the data into logical groups and sends each block of data over a different link.

The fail-over is handled entirely in software. The software sections off the data into logical groups and sends each block of data over a different link.

Endian-ness is now discussed. In accordance with some embodiments, of the six separate entities within each adaptor that communicate with the host bus, only two of the entities directly implicate Endian-ness issues. The modules—in one example, the receive status processor (RxStatProc), status processor (StatProc), transmit command DMA (TxQProc), and receive free list DMA (RxFProc)—all generate eight-byte aligned addresses and transfer 64-bit entities and, therefore, no Endian-ness issues are implicated. In the case of the receive status processor (RxStatProc), the commands are packed with NOPs so as to make the transfer be entirely of 64-bit entries.

The Receive and Transmit DMA paths (RxFIFO and TxFIFO) have a byte aligner between the adaptor and the host. This byte aligner converts from the host endian-ness to little endian format. The core runs in a little endian fashion. The host endian-ness is conveyed to the adaptor via a signal from the core.

The adaptor may operate in various modes. Reference is made to U.S. Provisional Patent Application No. 60/283, 286, filed Apr. 11, 2001 and incorporated herein by reference in its entirety. Particular reference is made to FIG. 1 of U.S. Provisional Patent Application No. 60/283,286 and to FIG. 1 of the present application The Switch Mode operation is now described. The Switch Mode is a simplified manner of employing the adaptor. The notable simplification is that the TxDMA module is not used and that the RxDMA module operates in linear addressing mode.

In the Switch Mode during the transmit operation, when a data packet arrives from the switch back plane, the packet arrives on the T-Bus to the adaptor. The adaptor then steers the T-Bus to the W-Bus. As such, the adaptor's TxDMA engine is completely bypassed. The raw data is routed to the W-Bus. It should be noted that the adaptor does not generate any payload to the switch fabric directly. It should be further noted that the Virtual Back Plane links Virtual Channels) are constructed based on the existing {Base-Upr, Base-Lwr} combination and 4 consecutive 64K regions.

In the Switch Mode during the receive operation, once a packet is received from the wire, the packet is written into the switch fabric. Sometime before the end of the packet, the Forwarding Engine produces an Rvec to the switch fabric for placement of the packet onto the appropriate destination queue. The packet is then submitted on the W-Bus to the appropriate adaptor. The adaptor, one per W-Bus, then transmits the packet to the proper destination node in a linear increment DMA fashion (through the switching back plane). The address to use is specific to each instantiation of adaptor. A given adaptor is one side of a virtual channel and as such, it uses a fixed address.

Flow control in the Switch Mode is now described. The adaptor maintains a hold off timer, which is programmed via an access by its Virtual Channel Link Partner. When the Link Partner's adaptor detects a High Water Mark from its core logic, the Link Partner's adaptor issues a PIO write to this adaptor's hold off timer (via a 64-bit access by the status processor). This throttles down all traffic generated by this adaptor for a specified amount of time. When the counter counts down to zero, the traffic resumes.

In the Switch Mode, the adaptor takes no special actions in case of Multicast and Broadcast In addition, in the Switch Mode, the adaptor takes no special actions for bundling. Furthermore, in the Switch Mode, the adaptor takes no special actions for Fail-Over.

The Network Processor Mode of operation is now described. In the Network Processor Mode of operation, the adaptor is mainly used to access the queuing system in the switch fabric. The data is read from the head of the RxFIFO into the host and is written into the head of the TxFIFO by the host The C-Bus is effectively switched onto the W-Bus. As such, the host is relieved of overhead of packet maintenance in the switch fabric. The packet can also be automatically switched if the host prepares the Rvec (and the Rvec-vld bit is set in the header) or if the packet is explicitly switched via the Forwarding Engine. Further, the packet checksum is calculated automatically.

The data is burst read and written from and to the head of the RxFIFO and TxFIFO by the processor on the C-Bus. The adaptor provides the count values of the number of entries in the FIFO's for flow control purposes, so that a continuous burst can be set up.

Processor Control is now discussed. In the Network Processor mode, the visible space of the host address space of the host address space from the RxDMA's point of view is mapped into a portion of the C-Bus address space. The upper 32-bits of the host address are provided from a adaptor local register.

What is claimed is:

1. A method for accomplishing a plurality of direct memory access data transfers from a host to an adaptor, comprising:

for each transfer,
- providing, from the host to the adaptor, an indication of locations of at least one group of storage locations associated with the host holding the data to be transferred to the adaptor;
- maintaining an indication of the provided indication, for that transfer, by the host;
- based on the indication of locations provided from the host to the adaptor, transferring data from the at least one group of storage locations to the adaptor;
- providing, from the adaptor to the host, an indication that the data transferring step has been completed with respect to the at least one group of storage locations; and
- by the host, determining the locations corresponding to the at least one group o storage locations based on the indications maintained by the host and freeing the locations of the at least one group of storage locations based on the determination.

2. The method of claim 1, further comprising:
the host maintaining a write pointer to the indications of locations maintained by the host for the plurality of transfers; and
the adaptor maintaining a read pointer to the indications of locations.

3. The method of claim 2, further comprising:
the host maintaining a shadow copy of the indications of locations write pointer.

4. The method of claim 3, further comprising:
the host maintaining the shadow copy of the indications of locations write pointer includes the host updating the shadow copy of the indications of locations write pointer, at periods greater than the periods of the data transfers.

5. The method of claim 4, further comprising:
the adaptor maintaining the indications of locations read pointer based on reading the indications of locations.

6. The method of claim 5, further comprising:
the adaptor reading the indications of locations based on a difference between the shadow copy of the indications of locations write pointer and the adaptor-maintained indications of locations read pointer.

7. The method of claim 6, wherein:
providing the indication of locations for a plurality of direct memory access data transfers includes:
- storing the indications of locations into a locations indications memory associated with the host; and
- performing a direct memory access read of the stored indications of locations from the locations indications memory.

8. The method of claim 7, wherein:
the storing and the direct memory access read are such that the locations indications memory is accessed in a first-in, last-out manner.

9. A method for accomplishing a plurality of direct memory access data transfers from an adaptor to host, comprising:

for each transfer,
- providing, from the host to the adaptor, an indication of locations of at least one group of storage locations associated with the host available to hold the data to be transferred to the host;
- maintaining an indication of the provided indication, for hat transfer, by the host;
- based on the indication of locations provided from the host to the adaptor, transferring data to the at least one group of storage locations from the adaptor;
- providing, from the adaptor to the host, an indication that the data transferring step has been completed with respect to the at least one group of storage locations; and
- by the host, determining the locations corresponding to the at least one group of storage locations based on the indications maintained by the host and retrieving the data from the at least one group of storage locations based on the determination.

10. The method of claim 9, further comprising:
the host maintaining a write pointer to the indications of locations maintained by the host for the plurality of transfers; and
the adaptor maintaining a read pointer to the indications of locations.

11. The method of claim 10, further comprising:
the host maintaining a shadow copy of the indications of locations write pointer.

12. The method of claim 11, further comprising:
the host maintaining the shadow copy of the indications of locations write pointer includes the host updating the shadow copy of the indications of locations write pointer, at periods greater than the periods of the data transfers.

13. The method of claim 12, further comprising:
the adaptor maintaining the indications of locations read pointer based on reading the indications of locations.

14. The method of claim 13, further comprising:
the adaptor reading the indications of locations based on a difference between the shadow copy of the indications of locations write pointer and the adaptor-maintained indications of locations read pointer.

15. The method of claim 14, wherein:
providing the indication of locations for a plurality of direct memory access data transfers includes:
- storing the indications of locations into a locations indications memory associated with the host; and
- performing a direct memory access read of the stored indications of locations from the locations indications memory.

16. The method of claim 15, wherein:
the storing and direct memory access read are such that the locations indications memory is accessed in a first-in, last-out manner.

* * * * *